INVENTOR
HUBERT B. HENEGAR
BY Allen M. Kress
ATTORNEYS

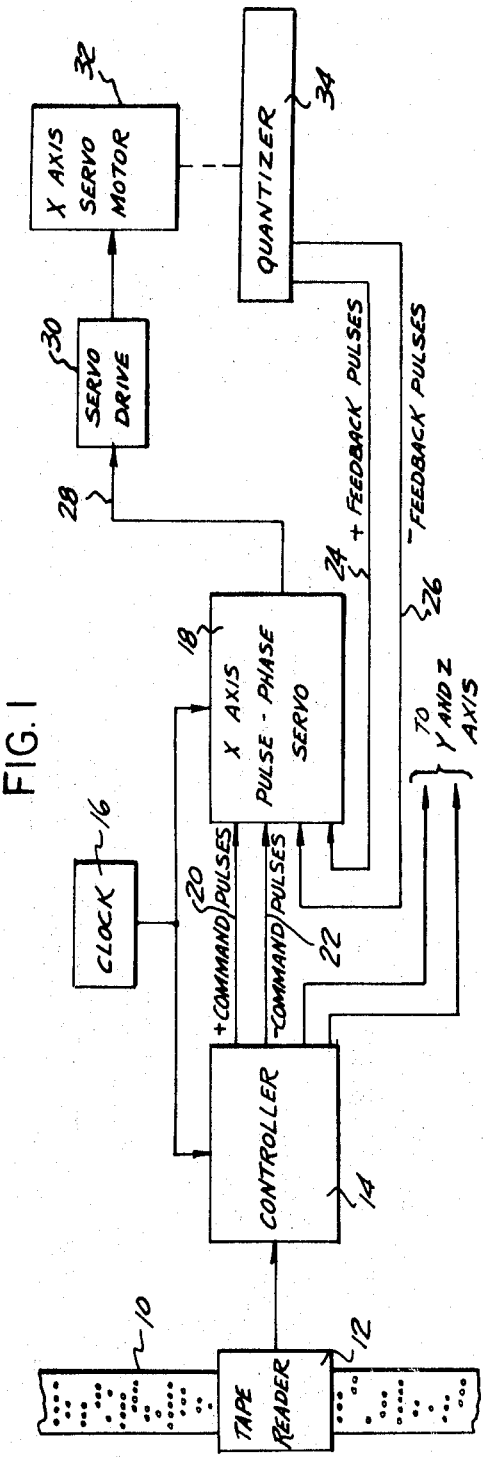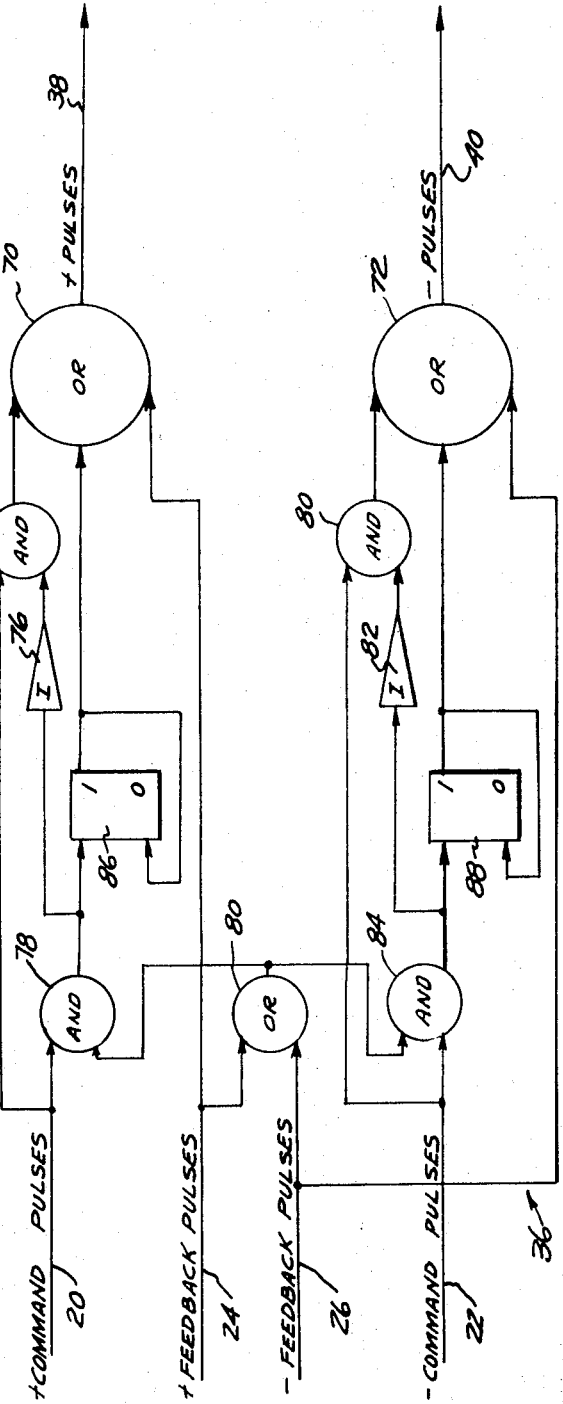

United States Patent Office 3,532,955
Patented Oct. 6, 1970

3,532,955
PULSE COMMAND-PULSE FEEDBACK PHASE COMPARISON CIRCUIT FOR A SERVO SYSTEM
Hubert B. Henegar, Detroit, Mich., assignor to The Bendix Corporation, a corporation of Delaware
Filed Aug. 28, 1967, Ser. No. 663,811
Int. Cl. G05b 19/24
U.S. Cl. 318—608                                  11 Claims

ABSTRACT OF THE DISCLOSURE

A servo system receives pulses as its command input and moves an output member through one increment of motion for each pulse received. A feedback transducer provides one output pulse for each increment of motion of the output member and these pulses, as well as the command input pulses, are used to shift the phase of a square wave with respect to a reference square wave of the same frequency. A phase comparator receives the two square waves and provides an output voltage proportional to their difference which is used to energize the driving motor for the servo.

BACKGROUND OF THE INVENTION

Field of the invention

This invention relates to a servo system for controlling the position of an output member in accordance with the information encoded in one or more input pulse trains wherein each input pulse represents an increment of motion of the output member, and more particularly to such a system wherein the pulses are used to phase shift a cyclical wave with respect to a reference wave of the same frequency.

Description of the prior art

Position control systems often employ a closed loop servo to power the controlled element to a position, or through a path, commanded by input data to the servo. In certain systems such as continuous path numerical control systems, the command input data may take the form of either an input pulse train and an auxiliary source of information relating to the sign of each pulse in the train, or alternatively a pair of pulse trains, one containing pulses directing an increment of motion in a first direction and the other containing pulses directing increments of motion in the opposite direction. In either case each pulse in the train, or trains, represents a command to the servo to move its output through a predetermined increment. Servo systems of this type are disclosed in Seid et al. U.S. Pat. No. 2,537,427 and Ho et al. U.S. Pat. No. 3,011,110.

The system of the Seid patent algebraically sums the command pulses into a reversible counter which also has a feedback input from a transducer providing an output pulse for each actual increment of motion of the output member. The feedback pulses are added or subtracted into the counter depending upon the direction of the motion of the output member. The total sum contained in the counter at any time is therefore representative of the difference between the commanded motion of the output member and its actual motion. An analog voltage is developed having a magnitude proportional to this count and the voltage is used to power the servo motor which drives the output member.

In the system disclosed in the Ho et al. patent the input command pulses are used to shift the phase of a command square wave with respect to a reference square wave and one of the waves is used to energize the stator of a resolver which has its shaft controlled by the motion of the output member with the output of the rotor being compared to the other square wave in order to develop an error voltage for driving the servo motor. In the Seid system the feedback transducer is necessarily a digital pulse generator and in the Ho system it is a resolver. This limits the engineering choice and in some machine systems, because of the accuracy requirements and the physical environment, it is convenient to use a resolver, while in other situations it is convenient to use a digital pulse generator. Accordingly, in the past, when the nature of the machine application suggested the use of a particular feedback element, such as a resolver, it was necessary to either use a Ho or phase analog type servo system or to use the less satisfactory pulse generator. The reverse situation also occurred.

SUMMARY OF THE INVENTION

The present invention contemplates a hydrid system which allows the use of a digital feedback transducer in a system organized very generally along the lines of a phase analog servo. Through use of the inventive system a generalized machine control unit may be designed and may be adapted to use of either a resolver or a digital pulse feedback element depending upon various environmental and economic criteria. The actual electronic system conversion necessary to adapt the resolver type system to a digital type feedback transducer is very slight. Accordingly, use of the present invention enables a machine designer to employ the most desirable form of feedback transducer without completely revising the servo system.

The servo system of the present invention also provides important advantages and component economy, reliability, and overall accuracy relative to either of the aforementioned systems.

The system of the present invention broadly employs a synchronizer which receives both the command pulses and feedback pulses from a digital transducer connected to the controlled member. The synchronizer effectively sums the feedback and command pulses over a short time period by allowing a pair of feedback and command pulses of opposite signs which occur during the same time interval to cancel one another out. If command and feedback pulses of the same sign occur during the same time interval the synchronizer effectively delays one of the pulses so that two pulses are provided as an output. These output pulse trains are used to shift the count of a bistable chain counter being fed from a clock source, by either inhibiting the application of one clock pulse to the counter, or inserting a count in a second stage of the counter rather than the first, depending upon the sign of an output signal from the synchronizer. The clock is also used to feed a second reference counter chain which is identical to the first, except that no pulses are added or subtracted to its input so its output constitutes a constant frequency reference wave. Accordingly, a phase shift is produced in the output of the first reference counter with respect to the second reference counter which is proportoional to the number and sign of the pulses provided by the synchronizer. The shifted wave and the reference wave are then applied to a well known detector circuit which produces an output voltage of a level proportional to the phase difference between its inputs. This voltage is supplied through suitable amplifiers and filters to the servo motor to close the loop.

When a servo formed in accordance with the present invention is specified in a general system and it is for some engineering reason desired to employ a resolver as a feedback element, it is only necessary to eliminate the synchronizer and feed the command pulses directly into the command counter, and to pass the output square wave of either counter through the resolver before feeding it to the detector.

It is therefore seen to be a broad object of the present invention to provide a hybrid digital-phase servo system which employs a pulse type feedback transducer, adds and subtracts both the feedback pulses and the command pulses into a pulse train provided to one counter, depending upon their sign, and compares the phase output of this counter with the output of a reference counter to provide an analog signal for the servo system.

Other objects, advantages and applications of the present invention will be made apparent by the following detailed description of a preferred embodiment of the invention. The description makes reference to the accompanying drawings in which:

FIG. 1 is a broad block diagram disclosing the environment of a servo system formed in accordance with a first embodiment of the invention;

FIG. 3 is a schematic diagram of a synchronizer employed in connection with the preferred embodiment of the invention.

Figure 2:
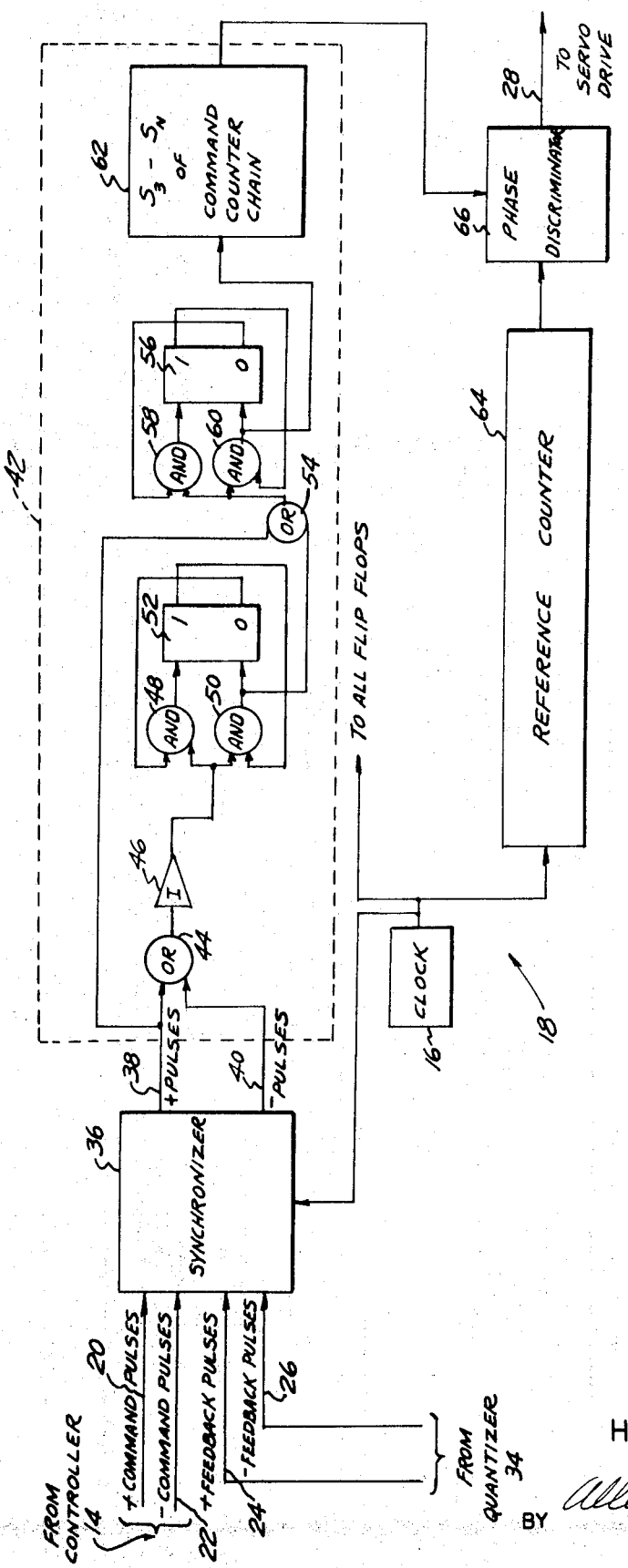
FIG. 2 is a more detailed block diagram, partly in schematic form, disclosing the internal sub-systems of the servo system of the preferred embodiment of the invention.

Referring to FIG. 1, the preferred embodiment of the invention is disclosed in connection with a numerically controlled contouring position control system which moves an output member in accordance with numerical data contained on an input tape 10. It should be recognized that the servo of the present invention is equally useful with other systems wherein an output motion is to be controlled in accordance with input pulses, including point-to-point positioning systems, computer graphic read-out devices and the like.

In the numerical control system of FIG. 1 the motion of an output member is to be controlled simultaneously along three mutually perpendicular axes, termed the X, Y and Z axes. A pulse-phase servo would be employed in connection with each of the axes, but the details of only one, the X axis, are shown because of the identity between the three.

In the preferred embodiment the numerical commands encoded in the punches of the tape 10 are sequentially converted into electrical signals by a tape reader 12 and supplied to a controller 14. The controller 14, as well as all of the other elements of the system, is synchronously controlled by a clock 16. The controller converts the taped commands into three groups of pulse trains, one group of which is supplied to each of the X, Y and Z axes. Each group includes one line which carries pulses of a positive sign and a second line carrying pulses of a negative sign. Alternatively, the system could provide only a single pulse train along with additional information relating to the sign of a pulse occurring on its output line.

The details of the controller 14 are not of importance to the present invention, as it simply constitutes a command pulse source which might be replaced by other sources in different embodiments of the invention. The controller 14 may be of the type disclosed in U.S. Pat. No. 3,128,374 to Ho et al.

The positive and negative command pulses for the X axis are supplied by the controller to an X axis pulse-phase servo 18 on lines 20 and 22 respectively. Each pulse in the positive command train on line 20 represents a commanded, or desired, motion of the output member through a basic increment of motion, such as .001 inch, in a first direction, while a pulse on the negative command pulse line 22 represents a similar increment of motion in the opposite direction. The pulse-phase servo 18 is also provided with a pair of pulse trains on lines 24 and 26 which represent increments of actual motion of the output member in the positive and negative directions respectively.

The function of the pulse-phase servo 18 is to accept the pulses representing commanded and actual motions of the member and to provide an output voltage on line 28 having an instantaneous polarity which is a function of the direction in which the output member must be moved to satisfy the input command, and having an instantaneous magnitude proportional to the rate at which the output member should be moved to satisfy the command. Effectively, the magnitude of this voltage is proportional to the algebraic difference between the sum of the command pulses received by the servo on lines 20 and 22 and the sum of the feedback pulses received on lines 24 and 26.

The output voltage on line 28 is provided to a servo drive unit 30 that may be of the electrical or hydraulic type and in turn powers an X axis servo motor 32 which actually moves the controlled member along the X axis. Either the motor 32, or the controlled member itself, is mechanically coupled to a quantizer 34 which provide output pulses on either line 24 or 26 for each increment of motion of the controlled member, the line to which the pulse is assigned being dependent upon the direction of motion of the member. One form of such quantizer is disclosed in U.S. Pat. No. 3,069,608 to Forrester et al.

The lines 24 and 26 effectively close the servo loop consisting of the units 18, 30, 32 and 34 so that the output member is driven at a rate and to a position commanded by the pulses on lines 20 and 22.

FIG. 2 discloses the details of the pulse-phase servo 18 partially in block and partially in schematic form. The positive and negative command pulses from the controller 14 on lines 20 and 22 respectively and the positive and negative feedback pulses from the quantizer 34 on lines 24 and 26 respectively are all provided to a synchronizer 36. The synchronizer prevents the provision of a command pulse simultaneously with a feedback pulse. It does this by effectively delaying a command pulse by one period of the clock 16 in the event that a feedback pulse and command pulse occur simultaneously. Other synchronizer designs may be employed in alternative embodiments of the invention. For example, the coincident command and feedback pulses could be summed to obtain outputs of ±2 or 0 pulses. This would require more hardware than the present design. The output of the synchronizer 36 constitutes two lines 38 and 40 on which positive and negative pulses are respectively provided to the balance of the circuitry. Accordingly, the balance of the circuitry does not distinguish command pulses from feedback pulses and they are treated in an identical manner.

These pulses are provided to a command counter 42 which is of the general type disclosed in the Ho et al. patent, supra. The command counter 42 effectively constitutes a binary counter chain which advances by one count on receipt of each pulse from the clock 16. A positive pulse occurring on line 38 causes an extra advance of the counter chain by introducing a pulse into the second stage of the chain rather than the first stage, where pulses are normally introduced. A negative pulse on line 40 inhibits one count which would normally be provided to the chain.

Both the positive pulses on line 38 and the negative pulses on line 40 are provided to an OR gate 44 that feeds the input of an inverter 46. The inverter output is normally in a set condition in the absence of any pulses from the gate 44 but is switched into its reset condition during the output of each pulse from the gate 44. The flip-flops in the circuit are synchronously switched by the pulses from the clock 16 which operate to switch the condition of the flip-flop if another appropriate input is provided.

The output of the inverter 46 conditions a pair of

AND gates 48 and 50 which provide their outputs to the set and reset inputs respectively of a flip-flop 52 constituting the first element in the counter chain of the command counter. The other conditioning input to the AND gate 48 comes from the reset output of the fiip-flop 52 while the other conditioning input of the AND gate 50 comes from the set output of the flip-flop 52. Accordingly, as long as the inverter output 46 is in its set condition the flip-flop 52 switches back and forth between its two states upon the occurrence of successive clock pulses. However, the application of a pulse from the OR gate 44 to the input of the inverter 46, and the resultant switching of that inverter output into its reset condiion for one clock period, effectively removes the conditioning inputs from the two AND gates 48 and 50 for one clock period and inhibits a change of state of the flip-flop 52 which would otherwise occur. Thus, the occurrence of either a positive or negative pulse from the synchronizer deletes one count from the command counter chain.

The positive pulses on line 38 are also provided to an OR gate 54 connecting the first stage of the counter to a flip-flop 56 constituting a second stage. When the flip-flop 52 is undergoing its normal changes of state a pulse output will occur from the AND gate 50 on every second change of state. This is the pulse which normally causes a change of state of the second flip-flop 56 and it is applied to a pair of AND gates 58 and 60 that are the equivalent of the AND gates 48 and 50 conditioning flip-flop 52. When a positive pulse is provided by the synchronizer on line 38 one change of state of the flip-flop 52 is deleted but a change of state of the second flip-flop 56 is actuated through the OR gate 54. This is the equivalent of adding two pulses into the first stage 52 and effectively advances the count of the command counter chain 42 by one extra step.

Every second change of state of flip-flop 56 is marked by an output of the AND gate 60 which is provided to the successive stages of the counter shown in block form at 62. These stages are substantially identical to the first and second stages. The output of the last stage of the counter train will constitute a square wave which changes state every $2^{s-1}$ or $2^s/2$ clock pulses, where $s$ is the number of stages in the command counter, plus or minus the number of pulses received on lines 38 and 40 during a given interval. The last stage output is a square-wave which passes through a complete cycle every $2^s$ input pulses.

A similar square wave output is generated by a reference counter 64 constituting a counter chain of the same length as the command counter without the pulse adding or inhibiting feature. Accordingly the output of the last stage of the reference counter 64 will be a square wave which changes state every $2^s/2$ or $2^{s-1}$ counts. The frequencies of the outputs of the command counter 42 and the reference counter 64 will be substantially identical, but the phase of the output of the command counter 42 will be advanced or retarded with respect to the phase of the output of the reference counter 64 by $1/2^s$ of one cycle for each net pulse provided on line 38 or 40. That is, if an identical number of positive and negative pulses have been provided on lines 38 and 40, the outputs of the reference and command counters will be identical in phase. For each pulse by which the total number of positive pulses on line 38 exceeds the number of negative pulses received on line 40 the phase of the output wave of the command counter 42 will be advanced by $1/2^s$ of a total square wave cycle. If the reference and command counter chains are each ten stages long, $2^s$ will equal 1024 and each positive pulse will advance the phase of the command counter by 1/1024 of a cycle and each negative pulse will retard the phase of the command counter with respect to the reference counter by 1/1024. A single reference counter may service all the axis servos in a system.

The outputs of the last stages of the command counter 42 and the reference counter 64 are applied to a phase discriminator 66, which may be of the type disclosed in U.S. Pat. No. 3,258,667. This discriminator provides an output voltage on line 28 which is a function of the phase-shift between the outputs of the command counter and the reference counter, having a positive sign if the phase of the command counter is advanced with respect to that of a reference counter and a negative sign if it is retarded. The magnitude of the voltage on line 28 is proportional to the phase-shift between the two outputs. If the phase-shift of the command wave, with respect to the reference wave exceeded $2^s/2$ this proportionality would not hold, but the dynamics of the system are chosen so as to obviate this occurrence.

The details of a synchronizer 36 are illustrated in FIG. 3. The positive feedback pulses on line 24 are provided to an OR gate 70 which provides as its output the positive pulse line 38. The negative feedback pulses are also provided to an OR gate 72 which provides output to the negative pulse line 40. Thus, positive and negative feedback pulses are directly gated to the command counter. The circuitry of the quantizer 34 is such as to prevent the occurrence of simultaneous positive and negative feedback pulses and the dynamics of the system are such as to prevent the occurrence of two successive feedback pulses in two successive clock periods.

The positive command pulses on line 20 are also fed to the OR gate 70 through an AND gate 74. The AND gate is conditioned by an inverter 76 which receives the output of another AND gate 78. The AND gate 78 is conditioned by the occurrence of a feedback pulse on either line 24 or 26 through OR gate 80 and the occurrence of a positive command pulse on line 20. Thus, in the absence of a simultaneous feedback pulse the gate 74 is conditioned by a signal from the inverter 76 and the positive command pulse is provided directly to the OR gate 70 and thus to the positive pulse output line 38. Similarly, negative command pulses on line 22 are fed to the OR gate 72 through the AND gate 80 which is conditioned by an inverter 82. The inverter 82 is in turn conditioned by an AND gate 84 which provides output when a negative command pulse occurs simultaneously with any feedback pulse. Negative command pulses which occur when no feedback pulses are received are thus gated out onto the line 40 through an OR gate 72.

When either a positive or a negative command pulse is received in the same clock period as a feedback pulse, the command pulse is delayed for one cycle. The delay of the positive command pulse is provided by a flip-flop 86 which is normally in its reset condition and is placed in its set condition by the occurrence of an output pulse from the AND gate 78, indicating that a positive command pulse has occurred in the same clock period as one of the feedback pulses. When the flip-flop 86 goes into its reset stage in the next clock period it provides an output for the positive pulse line 38 through the OR gate 70.

The flip-flop 88 performs the same function for negative pulses which occur simultaneously with either of the feedback pulses. It delays them for one clock period and then provides an output on line 72.

The dynamics of the system are such that no two feedback or command pulses will occur in successive clock periods. In systems where either feedback pulses or command pulses can occur in successive clock periods additional logical circuitry is required to further delay simultaneous pulses.

The synchronizer 36 is thus seen to accept both the command and feedback pulses and to provide them to the flip-flop 46 of the command counter in an non-simultaneous manner. The command counter then acts to sum them with the clock pulses to produce a phase output which is either advanced or retarded with respect to the phase of the output of the reference counter 64 by the net sum of positive and negative pulses received. The phase discriminator provides an output voltage which is proportional to the difference in phases in the command and reference signal which is used to drive the output member in such a direction as to bring the command counter phase back into accord with the reference.

Having thus described my invention, I claim:

1. A system for controlling the motion of an output member in accordance with a train of command pulses each commanding a motion of the output member through one increment, comprising: first and second counter chains of the same length; a source of clock pulses providing an input to each of said first and second counter chains, said first and second counter chains providing an output representative of a count of said clock pulses; means for modifying the count in the first counter chain by one count for each command pulse received so as to modify the phase of the output of the first counter chain with respect to the phase of the output of the second counter chain; phase comparator means for receiving the outputs of the first and second counter chains and providing an output signal which is a function of their phase difference; a servo motor responsive to the output signal of the phase comparator and operative to move the controlled member; a feedback transducer operative to provide a feedback pulse for each increment of motion of the output member; and means for modifying the count in the first counter chain by one count upon receipt of each feedback pulse from said feedback transducer.

2. The system of claim 1 wherein the command pulses may be either positive or negative sign, commanding motions in two different directions, and command pulses of one sign advance the count of the first counter chain and command pulses of the other sign retard the count of the first counter chain.

3. The system of claim 2 wherein the feedback pulses are either positive or negative sign depending upon the direction of motion of the output member and feedback pulses of one sign modify the count in the first counter chain by advancing it and feedback pulses of opposite sign modify the count by retarding it.

4. The system of claim 1 wherein the command pulses and the feedback pulses modify the count in the first counter chain in opposite directions.

5. The system of claim 1 wherein a motion of the output member through one increment as commanded by one command pulse produces a feedback pulse from the feedback transducer which modifies the count in the first counter chain in opposite direction to the manner in which it was modified by said command pulse.

6. The system of claim 1 wherein certain of the command pulses modify the count in the first counter chain by inhibiting the action of one of the pulses from the source of clock pulses on the first counter chain.

7. The system of claim 1 wherein said first counter chain comprises two stages and wherein at least certain of the pulses in the command pulse train modify the count in the first counter chain by adding a pulse into the second stage of the counter chain and inhibiting the application of one pulse from said source of clock pulses to the first stage of the counter chain.

8. The system of claim 1 wherein the increment of motion commanded by the command pulse train is the same as the increment of motion necessary to provide one feedback pulse from the feedback transducer.

9. The system of claim 1 wherein synchronizer means are provided to prevent the simultaneous application of a pulse from the feedback transducer and a command pulse to the first counter chain.

10. The system of claim 9 wherein the synchronizer, upon simultaneous receipt of a command pulse and a feedback pulse from the feedback transducer, provides one pulse to said first counter chain and stores a pulse for provision to said first counter chain following the next occurrence of a pulse from said source of clock pulses.

11. A system for controlling the motion of an output member in accordance with a train of input pulses each commanding a motion of the output member through one increment, comprising: first and second counter chains of the same length; a source of clock pulses providing an input to each of said first and second counter chains, said first and second counter chains providing an output representative of a count of said clock pulses; means for modifying the count in one of said counter chains according to said command pulses so as to modify the phase of the output of one counter chain with respect to the phase of the output of the other counter chain; phase comparator means for receiving the outputs of the first and second counter chains and providing an output signal which is a function of their phase difference; a servo motor responsive to the output signal of the phase comparator and operative to move the controlled member; a feedback transducer operative to provide pulses in accordance with motion of the output member; and means for modifying the count in one of the counter chains according to the pulses from said feedback transducer.

References Cited

UNITED STATES PATENTS

| | | |
|---|---|---|
| 2,943,248 | 6/1960 | Ritchey. |
| 2,983,872 | 5/1961 | Williamson et al. |
| 3,011,110 | 11/1961 | Ho et al. |
| 3,175,138 | 3/1965 | Kilroy et al. |
| 3,258,667 | 6/1966 | McDonough et al. |
| 3,320,501 | 5/1967 | Davies. |
| 3,374,359 | 3/1968 | Anderson. |

THOMAS E. LYNCH, Primary Examiner

U.S. Cl. X.R.

318—28